«Unassigned» United States Patent [19]

McKinney

[11] 4,040,579
[45] Aug. 9, 1977

[54] VARIABLE CAMBER LEADING EDGE AIRFOIL SYSTEM

[75] Inventor: Maurice E. McKinney, Bellevue, Wash.

[73] Assignee: The United States of America as represented by the Secretary of the Navy, Washington, D.C.

[21] Appl. No.: 607,177

[22] Filed: Aug. 25, 1975

[51] Int. Cl.² .............................................. B64C 3/48
[52] U.S. Cl. .................................................. 244/214
[58] Field of Search .......... 244/42 D, 42 DA, 42 DB, 244/43, 44, 42 R, 42 A, 42 B

[56] References Cited

U.S. PATENT DOCUMENTS

| | | | |
|---|---|---|---|
| 1,868,748 | 7/1932 | Hogan | 244/44 |
| 3,504,870 | 4/1970 | Cole et al. | 244/44 |
| 3,716,209 | 2/1973 | Pierce | 244/44 |
| 3,836,099 | 9/1974 | O'Neill et al. | 244/44 |
| 3,941,334 | 3/1976 | Cole | 244/44 X |

Primary Examiner—Trygve M. Blix
Assistant Examiner—Galen Barefoot

Attorney, Agent, or Firm—R. S. Sciascia; Charles D. B. Curry

[57] ABSTRACT

A variable camber leading edge airfoil system that is attached to the front of the fixed wing section of an aircraft. When the system is in the retracted position it provides an airfoil having a slight curvature suitable for supersonic flight and when in the extended position it provides an airfoil having a large curvature suitable for high lift subsonic flight. The system is capable of operating at any intermediate position depending upon the requirements of any particular flight conditions. The system includes a rigid lower panel, a leading edge beam, a flexible upper panel and an actuating mechanism. Actuation of the actuating mechanism to the extended position simultaneously causes the rigid lower panel to move downward and rotate counterclockwise, the leading edge beam to move downward and rotate counterclockwise, and causes the flexible upper panel to flex to a proper curvature and have the rearward edge move forward and slide along the upper forward edge of the fixed wing section.

2 Claims, 2 Drawing Figures

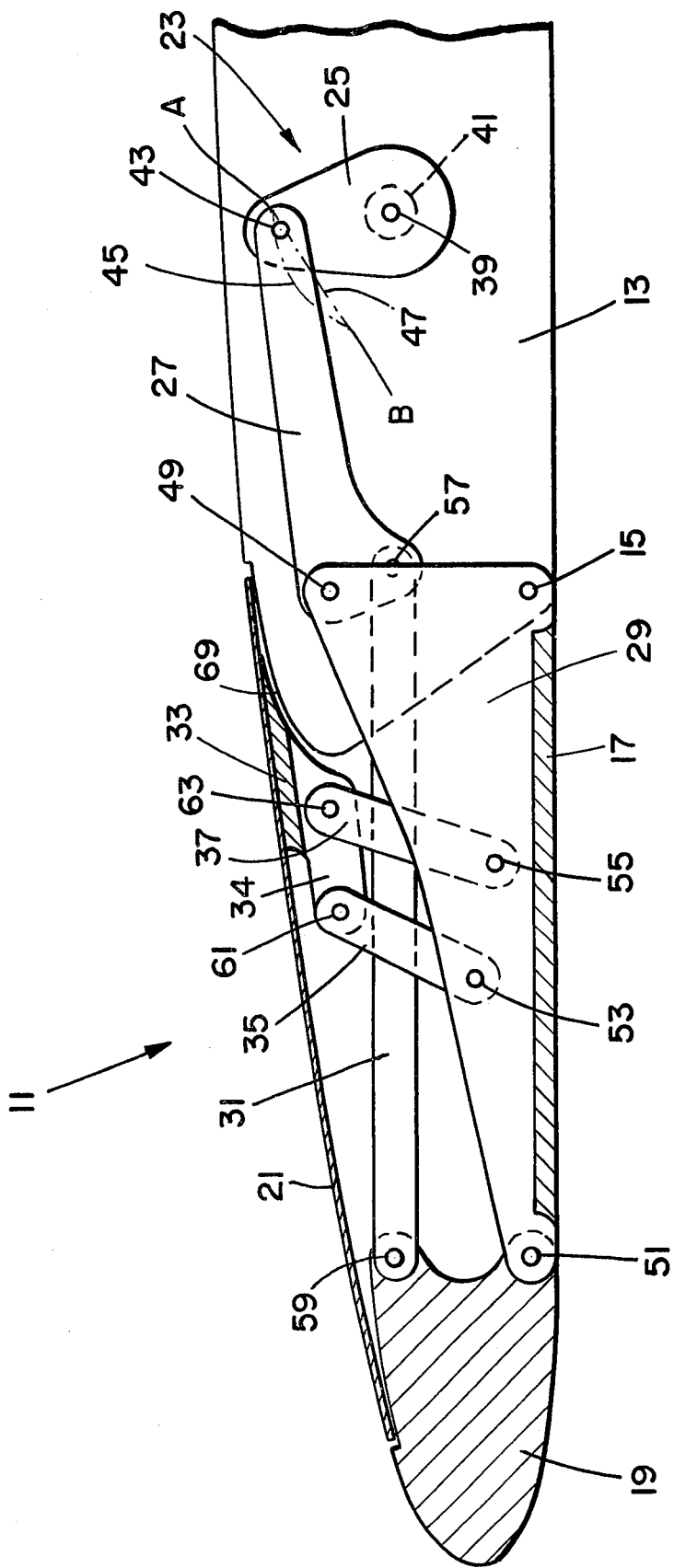
FIG_1A

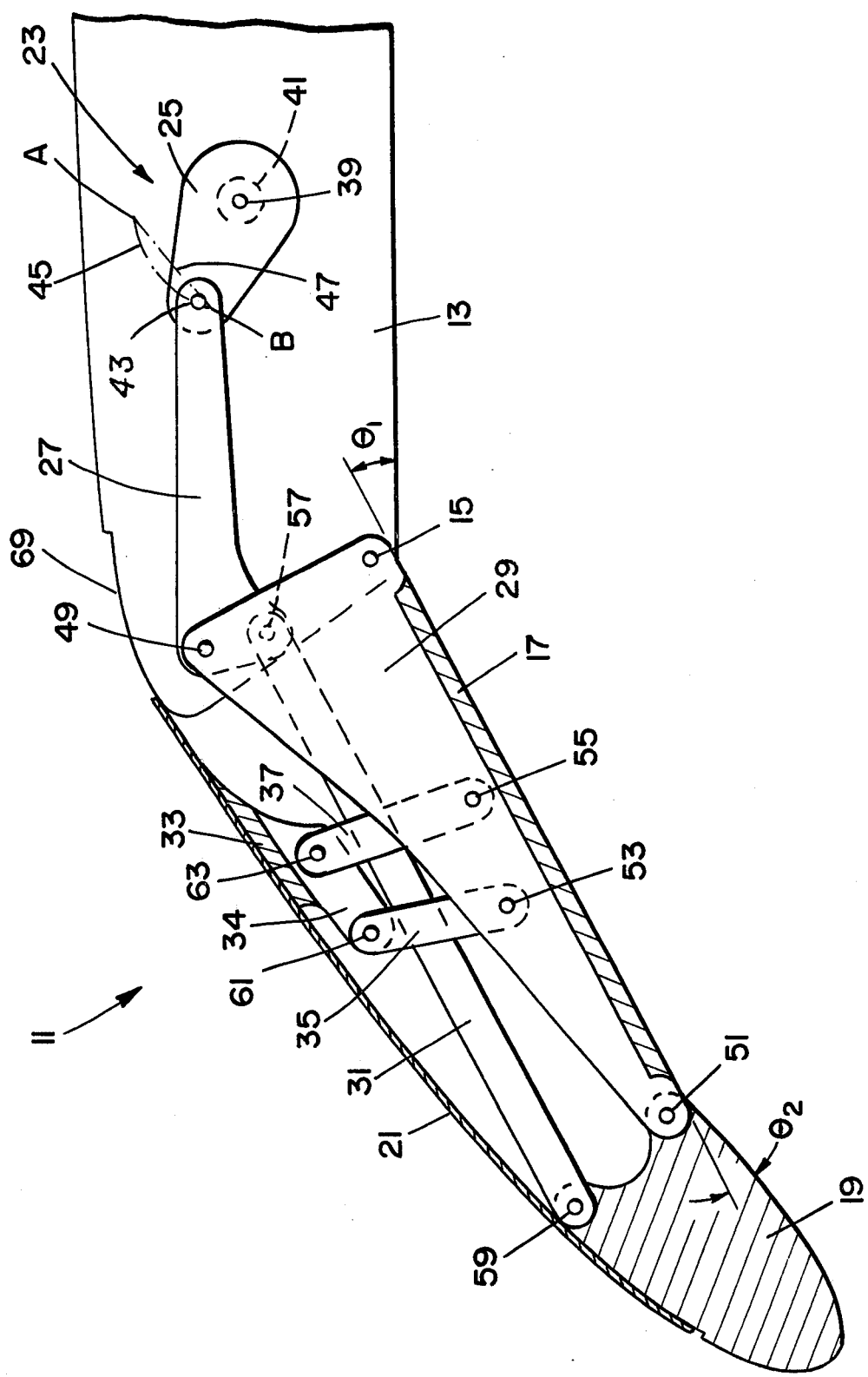
FIG_1B

VARIABLE CAMBER LEADING EDGE AIRFOIL SYSTEM

BACKGROUND OF THE INVENTION

1. Field of the Invention

The present invention relates to an airfoil system and more particularly to a variable camber leading edge airfoil system.

2. Description of the Prior Art

Prior variable camber leading edge airfoil systems for supersonic aircraft have had the primary disadvantage of providing insufficient camber change to provide sufficient lift for landing or take off at subsonic speeds. However, in those situations where prior systems have provided sufficient camber change they have either provided insufficient lift surface area or have provided an upper airfoil that has an insufficiently smooth curvature for proper aerodynamic operation. Moreover, the prior systems have tended to be complex and expensive.

The present invention overcomes these disadvantages by providing a variable camber leading edge airfoil system that provides sufficient camber change and sufficient lift surface area to provide proper lift at subsonic speeds. The present invention also provides an airfoil that is aerodynamically smooth for all conditions of operation. In addition, the present invention provides a system that is relatively simple, reliable and inexpensive.

SUMMARY OF THE INVENTION

Briefly, the present invention comprises a variable camber leading edge airfoil system that is attached to the front of the fixed wing section of an aircraft. When the system is in the retracted position it provides an airfoil having a slight curvature suitable for supersonic flight and when in the extended position it provides an airfoil having a large curvature suitable for high lift subsonic flight. The system is capable of operating at any intermediate position depending upon the requirements of any particular flight conditions. The system includes a rigid lower panel, a leading edge beam, a flexible upper panel and an actuating mechanism. Actuation of the actuating mechanism to the extended position simultaneously causes the rigid lower panel to move downward and rotate counterclockwise, the leading edge beam to move downward and rotate counterclockwise, and causes the flexible upper panel to flex to a proper curvature and have the rearward edge move forward and slide along the upper forward edge of the fixed wing section.

STATEMENT OF THE OBJECTS OF THE INVENTION

An object of the present invention is to provide a variable camber leading edge airfoil system that is relatively simple, reliable and inexpensive.

Another object of the present invention is to provide a variable camber leading edge airfoil system that provides sufficient camber change for proper lift for subsonic low speed landing and take off operations.

Still another object of the present invention is to provide a variable camber leading edge airfoil system that provides sufficient airfoil surface for proper lift for subsonic low speed landing and take off operations.

A further object of the present invention is to provide a variable camber leading edge airfoil system that provides a proper and aerodynamically smooth airfoil surface for proper subsonic and supersonic flight conditions.

Other objects, advantages and novel features of the invention will become apparent from the following detailed description of the invention when considered in conjunction with the accompanying drawings wherein:

BRIEF DESCRIPTION OF THE DRAWINGS

FIG. 1A is a side elevation schematic view of the variable camber leading edge airfoil system of the present invention in the retracted position which is particularly useful for supersonic flight; and FIG. 1B is a side elevation schematic view of the variable camber leading edge airfoil system of the present invention in the extended position which is particularly useful for subsonic flight.

DESCRIPTION OF THE PREFERRED EMBODIMENT

In FIGS. 1A and 1B are illustrated the variable camber leading edge airfoil system 11 of the present invention. FIGS. 1A and 1B are schematic or diagramatic illustrations of the system where FIG. 1A shows the system in the retracted position for supersonic flight and FIG. 1B shows the system in the extended position for low speed subsonic flight.

Referring to FIGS. 1A and 1B, the variable camber leading edge airfoil system 11 is connected along the lower fixed leading edge of the wing 13 as indicated by pivot point 15. The variable camber leading edge airfoil system 11 includes rigid lower panel 17, leading edge beam 19, flexible upper panel 21 and an actuating mechanism generally illustrated by reference numeral 23.

Actuating mechanism 23 includes power element 25, drive crank 27, lower panel drive element 29, leading edge beam drive link 31, upper panel bending beam 33 including a plurality of spaced apart brackets 34, forward upper panel bending beam drive link 35, and rearward upper panel bending beam drive link 37.

Power element 25 is shown as being rotatable about pivot point 39 and may be attached to and driven by a shaft shown by dotted lines 41. In actual practice shaft 41 preferably extends along the length of the wing, is driven by a single power source, not shown, and is connected to a plurality of similar power elements 25 that drive a plurality of associated actuating mechanisms 23 that are spaced apart and positioned as required along the length of the wing. As shown in FIGS. 1A and 1B, power element 25 is rotatable about pivot point 39 wherein pivot point 43 will traverse an arch 45 from point A, the fully retracted position of FIG. 1A, to point B, the fully extended position of FIG. 1B. It is to be understood that any type of drive system may be employed that will move pivot point 43, along arc 45 or along any path, such as straight line 47, providing it is compatible with the remainder of the hereinafter described variable camber leading edge airfoil system 11. It is to be understood that system 11 may be locked in the retracted or extended position or in any intermediate position by any of a plurality of methods that will rigidly fix pivot point 43. In actual practice pivot point 43 may be continuously moving as controlled by the power drive mechanisms, not shown, which may be controlled by the pilot or automatically by the flight system.

In FIGS. 1A and 1B, the end of power element 25 is rotatably attached at pivot point 43 located at the end of the rearwardly extending arm of drive crank 27. The pivot point 49 of drive crank 27 is rotatably attached to the upper rearward region of lower panel drive element 29. As previously indicated, the lower rearward region of lower panel drive element 29 is rotatably attached to the lower forward region of fixed wing section 13 along pivot point 15. It should be noted that lower panel drive element 29 is generally of a triangular configuration and has a plurality of functions including (1) providing a fixed pivot support, at pivot point 15, for the system 11, (2) a support for the rigid lower panel 17 along the lower side of drive element 29, (3) a support for leading edge beam 19, at pivot point 51, located at the forward end of drive element 29, (4) a support for drive link 35 at pivot point 53; and (5) a support for drive link 37 at pivot point 55.

The downwardly extending arm of drive crank 27 is rotatably attached to the rearward end of elongated drive link 31 at pivot point 57. The forward end of drive link 31 is rotatably attached to the upper region of leading edge beam 19 at pivot point 59. The upper end of drive link 35 is rotatably attached to the forward end of bracket 34 at pivot point 61 and the upper end of drive link 37 is rotatably attached to the rearward end of bracket 34 at pivot point 63.

It should be noted that the variable camber leading edge airfoil system 11 may be used throughout the length of the wing or at one or more sections along the length of the wing. It should be also noted that rigid lower panel 17, leading edge beam 19, flexible upper panel 21 and upper panel bending beam 33 extend the length of the controlled section. It should be also noted that the forward edge of the flexible upper panel 21 is rigidly attached to leading edge beam 19 along the entire length thereof. Moreover, it should be noted that the upper surface of upper panel bending beam 33 is rigidly attached near to the rearward end and along the length of the lower surface of flexible upper panel 21. The most rearward part of the lower edge of flexible upper panel 21 is in slidable engagement with upper forward slide section 69 of fixed wing 13. Slide section 69 also extends along the length of the controlled section.

OPERATION AND THEORY OF OPERATION

The operation of the variable camber leading edge airfoil system 11 of the present invention will now be described by reference to FIGS. 1A and 1B. It should be noted that the operation of system 11 is initiated by rotation of power element 25 by means of a power source, not shown, which rotates drive shaft 41, for example. It should also be noted that a plurality of systems 11, spaced along the wing, may be employed and may be simultaneously actuated by the power source. In addition, each system 11 will normally include a plurality of spaced apart actuating mechanisms 23 as required for proper operation. Since all of the systems 11 and actuating mechanisms 23 operate in the same manner, the following description will be with reference to only a single system 11 and single actuating mechanism 23 shown in FIGS. 1A and 1B.

When power element 25 is rotated counterclockwise, this causes drive crank 27 to have lateral forward movement and causes pivot point 49 to rotate about fixed pivot point 15 from the retracted position shown in FIG. 1A to the extended position shown in FIG. 1B. From this it can be seen lower panel drive element 29 rotates counterclockwise which causes rigid lower panel 17 and leading edge beams 19 to change their angular positions from (0°) and respectively $\theta_2$°.

The above described motion of drive crank 27 also causes pivot point 57 to have lateral forward movement and to rotate slightly clockwise about pivot point 49. The above described motion of drive crank 27 causes leading edge drive link 31 to have lateral forward movement and to rotate counterclockwise about pivot point 57. This action along with the previously described motion of lower panel drive element 29 causes pivot point 59 to rotate about pivot point 51 in a counterclockwise direction by an angle of $\eta_2$ From this it can be seen that the forward leading edge of beam 19 has been moved to its desired aerodynamic location being translated downward and rotated by an angle of $\theta_1 + \theta_2$.

For proper aerodynamic operation it has been found that it is not as important to have a smooth transition of curvature of the lower surface as it is of the upper surface. In accordance with the present invention this smooth transition of curvature of the upper surface is formed as described below.

The functions of drive links 35 and 37 are (1) to hold the lower rear edge of flexible upper panel 21 in contact with upper forward slide section 69 of fixed wing 13 and (2) to help bend the flexible upper panel 21 to its desired contour as shown in FIG. 1B. Referring to FIGS. 1A and 1B it can be seen that as drive link 31 and lower panel drive element 29 cause leading edge beam 19 to rotate that flexible upper panel 21 would extend upward and the rear edge would not be in contact with forward slide surface 69 if drive links 35 and 37 were not provided. It should be noted that only one of drive links 35 or 37 could be used but it has been found that both links are preferable. This is because, together, they provide a slight clockwise rotation of upper panel bending beam 33 relative to the flexible upper panel when it is extended to the position of FIG. 1B. This causes additional bending of flexible upper panel 21 to achieve the desired curvature shown in FIG. 1B.

The system shown in FIGS. 1A and 1B illustrates a single actuating mechanism 23 as including a single power element 25, crank 27, drive element 29, beam drive link 31, bracket 34, forward upper panel drive link 35 and rearward upper panel drive link 37. It is to be understood that two or more of these various elements may be used in a single actuating mechanism 23. Normally two or more of these various elements will be rotatably mounted on a common shaft, forming the various described pivot points, in a spaced apart parallel relationship to provide added strength or rigidity.

It is to be understood that various modifications of the above described variable camber leading edge aerodynamic system 11 will be obvious to one skilled in the art. That is, the various materials, shapes and sizes of the components may be modified to meet any particular design requirements. These design requirements are largely a function of the size and speed of the aircraft which dictate the degree of required camber changes, airfoil contours and load requirements.

What is claimed is:

1. A variable camber leading edge airfoil system that is attached to the forward section of the fixed wing section of an aircraft comprising:
   a. a rigid lower panel;
   b. a leading edge beam;
   c. a flexible upper panel;
   d. an actuating mechanism;

e. at least one lower panel drive element including first, second and third sides a first pivot point near the intersection of said first and second sides, a second pivot point near the intersection of said second and third sides and a third pivot point near the intersection of said third and first sides.

f. said first side of said lower panel drive element being rigidly connected to said rigid lower panel with said third pivot point being adjacent the forward edge of said rigid lower panel and said first pivot point being adjacent the rearward edge of said rigid lower panel, and said lower panel drive element and said rigid lower panel being rotatably mounted to the forward section of said fixed wing section at said first pivot point;

g. the rearward edge of said flexible upper panel being in slidable contact with the upper surface of said forward section of said fixed wing section;

h. and said lower panel drive element and the forward edge of said rigid lower panel being rotatably mounted at said third pivot point to the lower rearward edge of said leading edge beam;

i. the forward edge of said flexible panel being rigidly attached along the upper rearward edge of said leading edge beam;

j. said actuating mechanism including a power element, a drive crank and an elongated drive link;

k. said power element being operably connected to said drive crank and said drive crank being rotatably connected to said lower panel drive element at said second pivot point;

l. one end of said drive link being rotatably connected to said drive crank and the other end rotatably connected to the upper rearward section of said leading edge beam.

m. an upper panel bending beam including at least one bracket;

n. said upper panel bending beam being rigidly connected along the rearward edge of said flexible upper panel;

o. means interconnecting said bracket and said lower panel drive element;

p. counterclockwise rotation of said rigid lower panel and said lower panel drive element results in counter clock rotation of said flexible upper panel and clockwise rotation of said upper panel bending beam with respect to said flexible upper panel thereby causing additional bending of said flexible upper panel.

2. The system of claim 1 wherein:

a. said means include a first drive link having one end rotatably mounted on said lower panel drive element and the other end rotatably mounted on said bracket;

b. said means include a second drive link having one end rotatably mounted on said lower panel drive element and the other end rotatably mounted on said bracket; and c. said first drive link is positionel forward of said second drive link.

* * * * *